Feb. 16, 1954 A. B. DU MONT 2,669,708

ADJACENT AREA ILLUMINATOR FOR CATHODE-RAY TUBES

Filed April 28, 1949

INVENTOR.
ALLEN B. DU MONT
BY
Darby + Darby
ATTORNEYS

Patented Feb. 16, 1954

2,669,708

UNITED STATES PATENT OFFICE 2,669,708

ADJACENT AREA ILLUMINATOR FOR CATHODE-RAY TUBES

Allen B. Du Mont, Upper Montclair, N. J., assignor to Allen B. Du Mont Laboratories, Inc., Passaic, N. J., a corporation of Delaware Application April 28, 1949, Serial No. 90,110

1 Claim. (Cl. 340—367)

This invention relates to cabinets housing cathode ray tubes and particularly to television receivers.

An object of the invention is to permit the viewing of television pictures and the like without incuring eye fatigue. Another object is to minimize the effects of changes of ambient light upon the apparent brightness and contrast of a television picture.

In the viewing of television pictures in a room observers frequently turn out lights or in some other manner reduce the general illumination level in an effort to increase the apparent contrast of a picture or in the belief that such measures are necessary or desirable. As a result of these practices it frequently happens that the attention of the observer is maintained upon a bright television picture amidst very much darker surroundings. It has been found that such practices cause eye fatigue.

The eye fatigue so caused can be avoided by increasing the ambient or general illumination of the room, so that objects near the television viewing screen are illuminated to a level similar to that of the television screen. However, when light from a general source of illumination falls directly upon the face of the viewing screen, there is loss of contrast and loss of apparent picture detail.

In accordance with my invention, there is provided a television receiver cabinet having a source of illumination placed so that light from this source illuminates an area surrounding the viewing screen to a controlled brightness level without affecting the screen of the television tube.

My invention can be better understood by referring to the accompanying drawings, in which.

Figure 1:
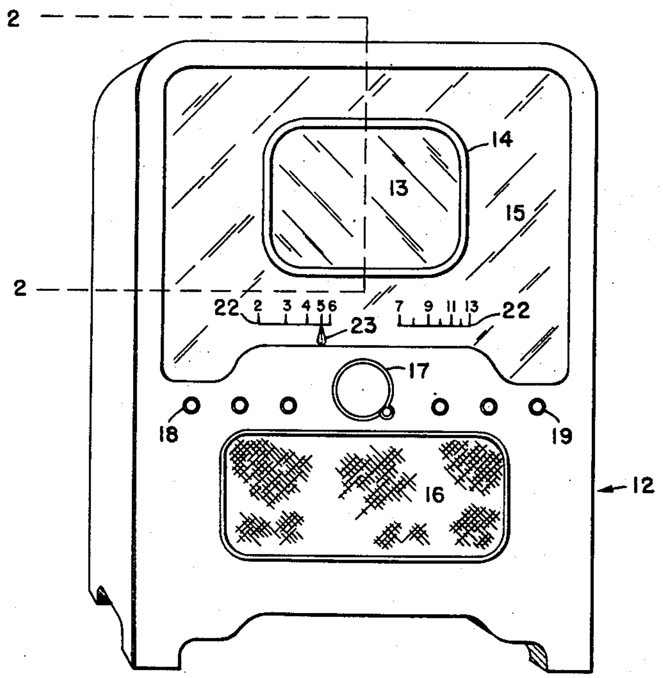
Figure 1 is a perspective view of a television receiver constructed in accordance with one embodiment of my invention.

Referring to Figure 1, a cabinet 12 for a television receiver contains a picture tube 13, a mask 14 surrounding the face of said tube and covering the unviewed portions thereof, and an illuminated area 15 surrounding the mask 14, the illuminated area being a particular feature of my invention.

In accordance with normal practice, the cabinet 12 also contains a loudspeaker mounted immediately behind the grille 16, a number of tuning and control knobs 17, 18 and 19, and a tuning scale 22 with a pointer 23. The arrangement of these parts varies with individual designs.

The area 15 of the front of the cabinet around the television tube screen is provided with illumination by a source located so that light therefrom will not shine upon the picture tube or directly at the eyes of the television observer. The light is distributed or diffused over the area by indirect or diffused lighting means. Specific structures for attaining the desired distribution of light are shown in Figures 2 and 3.

Figure 2:
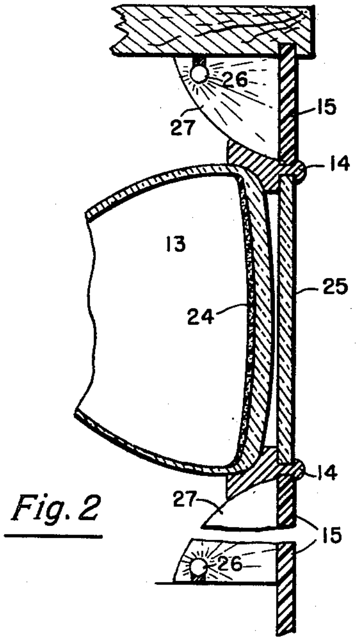
Figure 2 is a sectional view through 2—2 of Figure 1.

As may be seen in Figure 2, the face of the cathode tube 13, having a fluorescent viewing screen 24, rests against a fitted or formed mask 14. A plate 25 of safety glass is mounted in front of the face of the tube to protect the television observer against possible implosion of the cathode ray tube 13. The illuminated area 15 of the cabinet is, in this embodiment, made of transparent plastic of any desired appearance, and illuminated from within the cabinet by a light source 26, such as an incandescent lamp. A reflector 27 may be used if desired, positioned to reflect light from the lamp 26 onto the transparent area 15.

Figure 3:
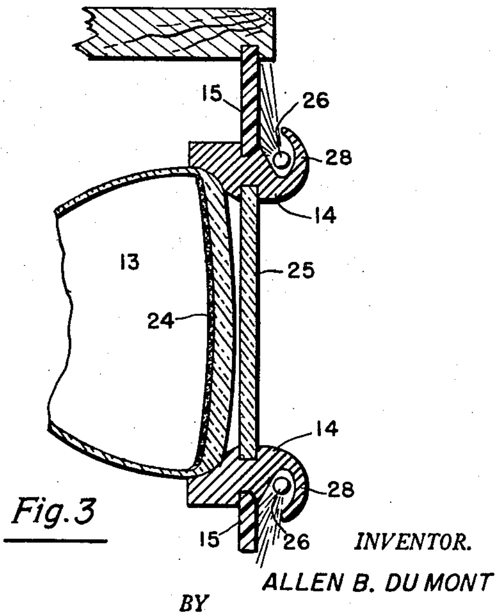
Figure 3 is a similar sectional view showing another embodiment of my invention.

A modification of the structure is shown in Figure 3 to provide a form of light diffusion known generally as "cove lighting." In this embodiment the mask 14 has an outwardly extending and curved edge or lip 28. The source 26 of illumination is positioned in the cove so as to be hidden from the observer in front of the set. The source of illumination in this case may be tubular incandescent lamps positioned around the face of the tube and mask. The area 15 is illuminated by the lights 26 presenting a reflective diffusion of light, and may be made of ordinary cabinet wood, or opaque plastic. As shown in Fig. 3, the source 26 of illumination is located near the part of the illuminated area 15 which is nearest the picture tube 13. The brightness of illumination falling on the area 15 will therefore be graduated. The area 15 will be the most brightly illuminated in a graduated manner radially outward from the picture tube 13. The graduated brightness of the illuminated area 15 serves to blend the relatively bright viewing screen 24 with the relatively dark cabinet 12 and surrounding space, in a manner that is pleasing and restful to an observer's eyes.

In the structure shown in Figures 2 and 3, the mask 14 performs the important function of providing a barrier between the cathode ray tube screen and the illuminated area, so that substantially no light from the source 26 falls either directly or by reflection upon the picture area. In this way the illumination causes no loss of contrast of the picture. As shown in the drawing, Figures 2 and 3, the mask 14 covers the edges of both the screen 24 and the safety glass 25, thus serving as a light barrier between these edges and the light source 26 or illuminated area 15.

Although in the embodiments shown the illuminated area 15 extends completely around the picture area, it will be apparent that this area may be divided into smaller areas, located near the viewing tube without departing from the scope of this invention. The greater the illuminated area, the more beneficial will be the results obtained. However, any illuminated area will provide some benefit. As a practical size it is preferable that the area be greater than one-fourth the picture screen area since the benefits derived will decrease rapidly with smaller areas. No extremely bright highlights should be visible within the field of vision of viewers of the television picture.

The part of the cabinet surrounding the viewing screen is kept illuminated to a level or intensity approximately equal to that of a room of ordinary illumination. The field of vision of a television viewer will be little affected by illumination changes in the room. The appearance of the television picture will be affected adversely only by very strong light shining directly upon the picture screen, the presence or absence of moderate room lighting having little or no adverse effect.

Those portions of the television receiver cabinet adjoining the masking around the face of the picture tube are considered to be adjacent or in proximity thereto.

Although specific embodiments of my invention have been shown and described, it will be apparent that many others are within the scope thereof, the choice of a particular embodiment being determined in many cases by considerations of cabinet styling and artistic appearance.

What is claimed is:

In a television receiver cabinet a television picture tube having a viewing screen, a safety glass positioned in front of said screen, a mask surrounding said screen and said safety glass and having an outwardly curved lip, and extending to cover the edges of both said screen and said glass and a light source positioned within the curve of said lip to project light transversely outwardly onto the area of said cabinet adjacent said screen to be reflected thereby.

ALLEN B. DU MONT.

References Cited in the file of this patent

UNITED STATES PATENTS

| Number | Name | Date |
|---|---|---|
| 2,298,870 | Cooper | Oct. 13, 1942 |
| 2,330,604 | Messner | Sept. 28, 1943 |
| 2,465,354 | Clark | Mar. 25, 1949 |
| 2,470,620 | Jackson | May 17, 1949 |

FOREIGN PATENTS

| Number | Country | Date |
|---|---|---|
| 110,923 | Australia | July 11, 1940 |
| 460,508 | Great Britain | Jan. 28. 1937 |

OTHER REFERENCES

Bedford Abstract #83,652 Feb. 20, 1951.

"Fundamentals of Optics," Jenkins & White, 2nd. Ed., McGraw-Hill Book Co., New York, 1950; pages 10, 11 and chapter 11.